United States Patent
Takeshima

(10) Patent No.: US 11,942,838 B2
(45) Date of Patent: Mar. 26, 2024

(54) ROTOR ASSEMBLING METHOD

(71) Applicant: TOYOTA JIDOSHA KABUSHIKI KAISHA, Toyota (JP)

(72) Inventor: Kenta Takeshima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 17/443,375

(22) Filed: Jul. 26, 2021

(65) Prior Publication Data
US 2022/0029510 A1    Jan. 27, 2022

(30) Foreign Application Priority Data

Jul. 27, 2020   (JP) .................... 2020-126886

(51) Int. Cl.
*H02K 15/03*     (2006.01)
*H02K 1/276*     (2022.01)
*H02K 1/28*      (2006.01)

(52) U.S. Cl.
CPC ............. *H02K 15/03* (2013.01); *H02K 1/276* (2013.01); *H02K 1/28* (2013.01)

(58) Field of Classification Search
CPC ........ H02K 1/276; H02K 1/2766; H02K 1/28; H02K 15/03
See application file for complete search history.

(56) References Cited

U.S. PATENT DOCUMENTS

| | | | |
|---|---|---|---|
| 11,171,431 B2 * | 11/2021 | Iwai | ................. H01R 12/89 |
| 2013/0032090 A1 | 2/2013 | Yano | |
| 2016/0111944 A1 | 4/2016 | Ohshima et al. | |
| 2018/0333858 A1 | 11/2018 | Asano et al. | |
| 2018/0339414 A1 | 11/2018 | Taguchi | |
| 2021/0197369 A1 | 7/2021 | Hasunuma et al. | |
| 2022/0029510 A1 * | 1/2022 | Takeshima | ........... H02K 1/2766 |
| 2022/0376572 A1 * | 11/2022 | Takeshima | ............... H02K 1/28 |

FOREIGN PATENT DOCUMENTS

| | | |
|---|---|---|
| JP | 2013031805 A | 2/2013 |
| JP | 5987978 B2 | 9/2016 |
| JP | 2018192568 A | 12/2018 |
| JP | 2018199172 A | 12/2018 |
| WO | 2014178246 A1 | 11/2014 |
| WO | 2019225746 A1 | 11/2019 |

* cited by examiner

*Primary Examiner* — Minh N Trinh

(74) *Attorney, Agent, or Firm* — Hunton Andrews Kurth LLP

(57) ABSTRACT

A method of assembling a rotor including a cylindrical rotor core and a permanent magnet that is held in a hole portion provided in the rotor core such that a longitudinal direction of the permanent magnet is parallel to an axis of the rotor core. The method includes: a load measuring step of measuring a load applied to the permanent magnet or/and the rotor core when the permanent magnet is brought into contact with the rotor core; and a moving step of moving the permanent magnet or/and the rotor core so as to change a position of the permanent magnet relative to the rotor core, depending on data relating to the load measured at the load measuring step, such that a positional deviation between the permanent magnet and the hole portion is reduced. Also disclosed is a control device for a rotor assembly apparatus.

7 Claims, 6 Drawing Sheets

ROTOR ASSEMBLING METHOD

This application claims priority from Japanese Patent Application No. 2020-126886 filed on Jul. 27, 2020, the disclosure of which is herein incorporated by reference in its entirety.

FIELD OF THE INVENTION

The present invention relates to a method of assembling a rotor for an embedded-magnet-type rotating electric machine including a permanent magnet, and also to a control device for a rotor assembly apparatus.

BACKGROUND OF THE INVENTION

There is known a rotor including a rotor core and a permanent magnet which is inserted into a hole portion provided in the rotor core and which is fixed in the hole portion by an adhesive or the like. A rotor disclosed in WO2014/178246 A1 is an example of such a rotor. This Japanese Patent Publication describes a method of assembling of the rotor in which the permanent magnet is positioned by a jig and is then inserted into the hole portion.

SUMMARY OF THE INVENTION

By the way, when the permanent magnet is to be inserted into the hole portion, there is a risk that the permanent magnet could not be inserted into the hole portion, in the event of a positional deviation between the permanent magnet and the hole portion. For improving an insertability of the permanent magnet into the hole portion in view of possible occurrence of the positional deviation, it might be possible to design the hole portion such that a cross section of the hole portion perpendicular to a longitudinal direction (i.e., depth direction) of the hole portion is made larger in area than a cross section of the permanent magnet perpendicular to a longitudinal direction of the permanent magnet. However, gap between the rotor core and the permanent magnet is increased with increase of the cross sectional area of the hole portion relative to the cross sectional area of the permanent magnet, thereby resulting in reduction of performance of a rotating electric machine in which the rotor is provided.

The present invention was made in view of the background art described above. It is therefore an object of the present invention to provide a method of assembling a rotor and a control device for a rotor assembly apparatus, which make it possible to reduce gap between the rotor core and the permanent magnet while suppressing reduction of an insertability of the permanent magnet into a hole portion of the rotor core.

The object indicated above is achieved according to the following aspects of the present invention.

According to a first aspect of the invention, there is provided a method of assembling a rotor including a cylindrical rotor core and a permanent magnet that is held in a hole portion provided in the rotor core such that a longitudinal direction of the permanent magnet is parallel to an axis of the rotor core. The method comprises: (a) a first moving step of moving at least one of the permanent magnet and the rotor core so as to change a position of the permanent magnet relative to the rotor core, such that a longitudinal end portion of the permanent magnet is positioned to be opposed to an opening of the hole portion; (b) a load measuring step of, after the first moving step, moving one of the permanent magnet and the rotor core toward the other of the permanent magnet and the rotor core in an approaching direction that is parallel to the axis, and measuring a load applied to at least one of the permanent magnet and the rotor core, by a load sensor, when the longitudinal end portion of the permanent magnet is brought into contact with the rotor core; (c) a second moving step of, after the load measuring step, moving at least one of the permanent magnet and the rotor core so as to change the position of the permanent magnet relative to the rotor core, depending on data relating to the load measured at the load measuring step, such that a positional deviation between the permanent magnet and the hole portion, as seen in a direction parallel to the axis, is reduced; and (d) an inserting step of, after the second moving step, inserting the permanent magnet into the hole portion, by moving the one of the permanent magnet and the rotor core relative to the other of the permanent magnet and the rotor core in a direction same as the approaching direction. It is noted that the above-described "positional deviation between the permanent magnet and the hole portion, as seen in a direction parallel to the axis" may be expressed also as "positional deviation between the permanent magnet and the hole portion, in a direction perpendicular to the axis".

According a first arrangement of the first aspect of the invention, at the first moving step, the permanent magnet is moved relative to the rotor core, such that the longitudinal end portion of the permanent magnet is positioned to be opposed to the opening of the hole portion, wherein, at the load measuring step, the permanent magnet is moved in the approaching direction that is toward the opening, wherein, at the second moving step, the permanent magnet is moved relative to the rotor core, depending on the data relating to the load, such that the positional deviation is reduced; and wherein, at the inserting step, the permanent magnet is moved relative to the rotor core in the direction same as the approaching direction, so as to insert the permanent magnet into the hole portion.

According to a second arrangement of the first aspect of the invention, the data relating to the load include amounts of respective two components of the load which act in respective two directions perpendicular to each other and perpendicular to the axis, wherein, at the second moving step, each of the at least one of the permanent magnet and the rotor core is moved in a direction dependent on the amounts of the respective two components of the load.

According to a second aspect of the invention, in the method according to the first aspect of the invention, the second moving step is implemented when the load measured at the load measuring step exceeds a predetermined load limit, and the inserting step is implemented when the load measured at the load measuring step does not exceed the predetermined load limit.

According to a third aspect of the invention, in the method according to the first or second aspect of the invention, when the load measured at the load measuring step exceeds the predetermined load limit, movement of the one of the permanent magnet and the rotor core toward the other of the permanent magnet and the rotor core is stopped or suspended at the load measuring step.

According to a fourth aspect of the invention, in the method according to any one of the first through third aspects of the invention, the second moving step is implemented a plurality of times, after the first moving step and before the inserting step.

According to a fifth aspect of the invention, in the method according to any one of the first through fourth aspects of the invention, at the first moving step, the at least one of the permanent magnet and the rotor core is moved so as to change the position of the permanent magnet relative to the rotor core, depending on data representing images of the hole portion and the permanent magnet which are taken by cameras.

According to a sixth aspect of the invention, there is provided a control device or a rotor assembly apparatus for assembling a rotor including a cylindrical rotor core and a permanent magnet that is held in a hole portion provided in the rotor core such that a longitudinal direction of the permanent magnet is parallel to an axis of the rotor core. The control device comprises: (a) a first-movement control portion configured to move at least one of the permanent magnet and the rotor core so as to change a position of the permanent magnet relative to the rotor core, such that a longitudinal end portion of the permanent magnet is positioned to be opposed to an opening of the hole portion; (b) a load-measurement control portion configured, after the at least one of the permanent magnet and the rotor core is moved by the first-movement control portion, to move one of the permanent magnet and the rotor core toward the other of the permanent magnet and the rotor core in an approaching direction that is parallel to the axis, and to measure a load applied to at least one of the permanent magnet and the rotor core, by a load sensor, when the longitudinal end portion of the permanent magnet is brought into contact with the rotor core; (c) a second-movement control portion configured, after the load is measured by the load-measurement control portion, to move at least one of the permanent magnet and the rotor core so as to change the position of the permanent magnet relative to the rotor core, depending on data relating to the load measured by the load-measurement control portion, such that a positional deviation between the permanent magnet and the hole portion, which is as seen in a direction parallel to the axis, is reduced; and (d) an insertion control portion configured, after the at least one of the permanent magnet and the rotor core is moved by the second-movement control portion, to insert the permanent magnet into the hole portion, by moving the one of the permanent magnet and the rotor core relative to the other of the permanent magnet and the rotor core in a direction same as the approaching direction.

According to a first arrangement of the sixth aspect of the invention, the first-movement control portion is configured to move the permanent magnet relative to the rotor core, such that the longitudinal end portion of the permanent magnet is positioned to be opposed to the opening of the hole portion, wherein the load-measurement control portion is configured to move the permanent magnet in the approaching direction that is toward the opening, wherein the second-movement control portion is configured to move the permanent magnet relative to the rotor core, depending on the data relating to the load, such that the positional deviation is reduced; and wherein the insertion control portion is configured to move the permanent magnet relative to the rotor core in the direction same as the approaching direction, so as to insert the permanent magnet into the hole portion.

According to a second arrangement of the sixth aspect of the invention, the data relating to the load include amounts of respective two components of the load which act in respective two directions perpendicular to each other and perpendicular to the axis, wherein the second-movement control portion is configured to move each of the at least one of the permanent magnet and the rotor core in a direction dependent on the amounts of the respective two components of the load.

According to a seventh aspect of the invention, in the control device according to the sixth aspect of the invention, the second-movement control portion is configured to move the at least one of the permanent magnet and the rotor core so as to change the position of the permanent magnet relative to the rotor core, when the load measured by the load-measurement control portion exceeds a predetermined load limit, and the insertion control portion is configured to insert the permanent magnet into the hole portion, when the load measured by the load-measurement control portion does not exceed the predetermined load limit.

According to an eighth aspect of the invention, in the control device according to the seventh aspect of the invention, when the load measured by the load-measurement control portion exceeds the predetermined load limit, the load-measurement control portion is configured to stop or suspend movement of the one of the permanent magnet and the rotor core toward the other of the permanent magnet and the rotor core.

According to a ninth aspect of the invention, in the control device according to any one of the sixth through eighth aspects of the invention, the second-movement control portion is configured to move the at least one of the permanent magnet and the rotor core a plurality of times, so as to change the position of the permanent magnet relative to the rotor core the plurality of times, before the permanent magnet is inserted into the hole portion by the insertion control portion.

According to a tenth aspect of the invention, in the control device according to any one of the sixth through ninth aspects of the invention, the first-movement control portion is configured to move the at least one of the permanent magnet and the rotor core so as to change the position of the permanent magnet relative to the rotor core, depending on data representing images of the hole portion and the permanent magnet which are taken by cameras.

In the method according to the first aspect of the invention, the method comprises: (a) the first moving step of moving the at least one of the permanent magnet and the rotor core so as to change the position of the permanent magnet relative to the rotor core, such that the longitudinal end portion of the permanent magnet is positioned to be opposed to the opening of the hole portion; (b) the load measuring step of, after the first moving step, moving the one of the permanent magnet and the rotor core toward the other of the permanent magnet and the rotor core in the approaching direction that is parallel to the axis, and measuring the load applied to the at least one of the permanent magnet and the rotor core, by the load sensor, when the longitudinal end portion of the permanent magnet is brought into contact with the rotor core; (c) the second moving step of, after the load measuring step, moving the at least one of the permanent magnet and the rotor core so as to change the position of the permanent magnet relative to the rotor core, depending on the data relating to the load measured at the load measuring step, such that the positional deviation between the permanent magnet and the hole portion, as seen in the direction parallel to the axis, is reduced; and (d) the inserting step of, after the second moving step, inserting the permanent magnet into the hole portion, by moving the one of the permanent magnet and the rotor core relative to the other of the permanent magnet and the rotor core in the direction same as the approaching direction. The position of the permanent magnet relative to the rotor core is corrected by implementations of the load measuring step and the second moving step, such that the positional deviation between the permanent magnet and the hole portion, as seen in the direction parallel to the axis, is reduced, whereby reduction of an insertability of the permanent magnet is suppressed even if a cross section of the hole portion perpendicular to the longitudinal direction of the hole portion is reduced in area, as compared with a method without the load measuring step and the second moving step. Thus, it is possible to reduce gap between the rotor core and the permanent magnet while suppressing the reduction of the insertability of the permanent magnet into the hole portion of the rotor core, and accordingly to improve performance of a rotating electric machine in which the rotor assembled according to the present method is provided.

In the method according to the second aspect of the invention, the second moving step is implemented when the load measured at the load measuring step exceeds the predetermined load limit, and the inserting step is implemented when the load measured at the load measuring step does not exceed the predetermined load limit. That is, when the measured load exceeds the predetermined load limit, the position of the permanent magnet relative to the rotor core is corrected. When the measured load does not exceed the predetermined load limit, the load measuring step is followed by the inserting step whereby the permanent magnet is inserted into the hole portion immediately after implementation of the load measuring step.

In the method according to the third aspect of the invention, when the load measured at the load measuring step exceeds the predetermined load limit, movement of the one of the permanent magnet and the rotor core toward the other of the permanent magnet and the rotor core is stopped or suspended at the load measuring step. That is, when the measured load exceeds the predetermined load limit, the movement of the one of the permanent magnet and the rotor core toward the other of the permanent magnet and the rotor core is suspended, whereby deformation of the permanent magnet and the rotor core, which could be caused by the contact of the permanent magnet and the rotor core, can be suppressed. Thus, it is possible to suppress the reduction of the insertability of the permanent magnet into the hole portion while suppressing the deformation of the permanent magnet and the rotor core, namely, improving the performance of the rotating electric machine.

In the method according to the fourth aspect of the invention, the second moving step is implemented the plurality of times, after the first moving step and before the inserting step. With the second moving step being implemented the plurality of times between the moving step and the inserting step, correction of the position of the permanent magnet relative to the rotor core is made repeated times so as to reduce the positional deviation between the permanent magnet and the hole portion as seen in the direction parallel to the axis. Therefore, the reduction of the insertability of the permanent magnet is suppressed even if the cross section of the hole portion perpendicular to the longitudinal direction is reduced in area, as compared with a method in which the second moving step is not implemented repeated times. Further, it is possible to reduce the gap between the rotor core and the permanent magnet and accordingly to further improve performance of the rotating electric machine.

In the method according to the fifth aspect of the invention, at the first moving step, the at least one of the permanent magnet and the rotor core is moved so as to change the position of the permanent magnet relative to the rotor core, depending on data representing images of the hole portion and the permanent magnet which are taken by cameras. In this method in which the at least one of the permanent magnet and the rotor core is moved depending on the data representing the images taken by the cameras, the position of the permanent magnet relative to the hole portion can be accurately recognized as compared with a method in which the at least one of the permanent magnet and the rotor core is moved without depending on the image data. Thus, the positional deviation between the permanent magnet and the hole portion, as seen in the direction parallel to the axis, after implementation of the first moving step, can be made relatively small. Therefore, as compared with the method in which the at least one of the permanent magnet and the rotor core is moved without depending on the image data, the positional deviation between the permanent magnet and the hole portion, as seen in the direction parallel to the axis, can be quickly made small, and the insertion of the permanent magnet can be made quickly even if the cross section of the hole portion perpendicular to the longitudinal direction is reduced in area.

In the control device according to the sixth aspect of the invention, the control device is for the rotor assembly apparatus for assembling the rotor including the cylindrical rotor core and the permanent magnet that is held in the hole portion provided in the rotor core such that the longitudinal direction of the permanent magnet is parallel to the axis of the rotor core. The control device comprises: (a) the first-movement control portion configured to move the at least one of the permanent magnet and the rotor core so as to change the position of the permanent magnet relative to the rotor core, such that the longitudinal end portion of the permanent magnet is positioned to be opposed to the opening of the hole portion; (b) the load-measurement control portion configured, after the at least one of the permanent magnet and the rotor core is moved by the first-movement control portion, to move the one of the permanent magnet and the rotor core toward the other of the permanent magnet and the rotor core in the approaching direction that is parallel to the axis, and to measure the load applied to the at least one of the permanent magnet and the rotor core, by the load sensor, when the longitudinal end portion of the permanent magnet is brought into contact with the rotor core; (c) the second-movement control portion configured, after the load is measured by the load-measurement control portion, to move the at least one of the permanent magnet and the rotor core so as to change the position of the permanent magnet relative to the rotor core, depending on data relating to the load measured by the load-measurement control portion, such that the positional deviation between the permanent magnet and the hole portion, which is as seen in a direction parallel to the axis, is reduced; and (d) the insertion control portion configured, after the at least one of the permanent magnet and the rotor core is moved by the second-movement control portion, to insert the permanent magnet into the hole portion, by moving the one of the permanent magnet and the rotor core relative to the other of the permanent magnet and the rotor core in the direction same as the approaching direction. The position of the permanent magnet relative to the rotor core is corrected by cooperation of the load-measurement control portion and the second-movement control portion, such that the positional deviation between the permanent magnet and the hole portion, as seen in the direction parallel to the axis, is reduced, whereby the reduction of the insertability of the permanent magnet is suppressed even if the cross section of the hole portion perpendicular to the longitudinal direction of the hole portion is reduced in area, as compared with a control apparatus without the load-measurement control portion and the second-movement control portion. Thus, it is possible to reduce the gap between the rotor core and the permanent magnet while suppressing the reduction of the insertability of the permanent magnet into the hole portion of the rotor core, and accordingly to improve performance of the rotating electric machine.

In the control device according to the seventh aspect of the invention, the at least one of the permanent magnet and the rotor core is moved by the second-movement control portion, so as to change the position of the permanent magnet relative to the rotor core, when the load measured by the load-measurement control portion exceeds the predetermined load limit, and the permanent magnet is inserted into the hole portion by the insertion control portion when the load measured by the load-measurement control portion does not exceed the predetermined load limit. That is, when the measured load exceeds the predetermined load limit, the position of the permanent magnet relative to the rotor core is corrected. When the measured load does not exceed the predetermined load limit, the movement of the one of the permanent magnet and the rotor core in the approaching direction by the load-measurement control portion is followed by the insertion of the permanent magnet into the hole portion by the insertion control portion whereby the permanent magnet is inserted into the hole portion immediately after the load is measured by the load-measurement control portion.

In the control device according to the eighth aspect of the invention, when the load measured by the load-measurement control portion exceeds the predetermined load limit, movement of the one of the permanent magnet and the rotor core toward the other of the permanent magnet and the rotor core is stopped or suspended by the load-measurement control portion. That is, when the measured load exceeds the predetermined load limit, the movement of the one of the permanent magnet and the rotor core toward the other of the permanent magnet and the rotor core is suspended, whereby the deformation of the permanent magnet and the rotor core, which could be caused by the contact of the permanent magnet and the rotor core, can be suppressed. Thus, it is possible to suppress the reduction of the insertability of the permanent magnet into the hole portion while suppressing the deformation of the permanent magnet and the rotor core, namely, improving the performance of the rotating electric machine.

In the control device according to the ninth aspect of the invention, the movement of the at least one of the permanent magnet and the rotor core is repeated the plurality of times by the second-movement control portion, before the insertion of the permanent magnet into the hole portion by the insertion control portion. With the movement of the at least one of the permanent magnet and the rotor core being repeated the plurality of times by the second-movement control portion before the insertion of the permanent magnet into the hole portion by the insertion control portion, the correction of the position of the permanent magnet relative to the rotor core is made repeated times so as to reduce the positional deviation between the permanent magnet and the hole portion as seen in the direction parallel to the axis. Therefore, the reduction of the insertability of the permanent magnet is suppressed even if the cross section of the hole portion perpendicular to the longitudinal direction is reduced in area, as compared with an arrangement in which the movement of the at least one of the permanent magnet and the rotor core is not made repeated times by the second-movement control portion. Further, it is possible to reduce the gap between the rotor core and the permanent magnet and accordingly to further improve performance of the rotating electric machine.

In the control device according to the tenth aspect of the invention, the first-movement control portion is configured to move the at least one of the permanent magnet and the rotor core so as to change the position of the permanent magnet relative to the rotor core, depending on data representing images of the hole portion and the permanent magnet which are taken by cameras. In this arrangement in which the at least one of the permanent magnet and the rotor core is moved depending on the data representing the images taken by the cameras, the position of the permanent magnet relative to the hole portion can be accurately recognized as compared with an arrangement in which the at least one of the permanent magnet and the rotor core is moved without depending on the image data. Thus, the positional deviation between the permanent magnet and the hole portion, as seen in the direction parallel to the axis, after the movement of the at least one of the permanent magnet and the rotor core by the first-movement control portion, can be made relatively small. Therefore, as compared with the arrangement in which the at least one of the permanent magnet and the rotor core is moved without depending on the image data, the positional deviation between the permanent magnet and the hole portion, as seen in the direction parallel to the axis, can be quickly made small, and the insertion of the permanent magnet can be made quickly even if the cross section of the hole portion perpendicular to the longitudinal direction is reduced in area.

DETAILED DESCRIPTION OF PREFERRED EMBODIMENTS

The appended claims include claims 1-14, wherein each of claims 1-7 is directed to a method of assembling a rotor while each of claims 8-14 is directed to a control device for a rotor assembly apparatus. Although being different from each other in claim category, each of claims 1-7 and a corresponding one of claims 8-14 are substantially identical with each other in technical feature. Specifically, claims 1-7 recite steps such as "first moving step", "load measuring step", "second moving step" and "inserting step", while claims 8-14 recite control portions such as "first-movement control portion", "load-measurement control portion", "second-movement control portion" and "insertion control portion". Each of the "first moving step", "load measuring step", "second moving step" and "inserting step" and a corresponding one of the "first-movement control portion", "load-measurement control portion", "second-movement control portion" and "insertion control portion" are substantially identical with each other in technical feature, although being different from each other in terms "step" and "control portion" that are typical terms used in claims directed to a method and a control device, respectively.

Hereinafter, preferred embodiments of the invention will be described in detail with reference to the accompanying drawings. It is noted that figures of the drawings are simplified or deformed as needed and portions are not necessarily precisely depicted in terms of dimension ratio, shape, etc., for easier understanding.

First Embodiment

Figure 1:
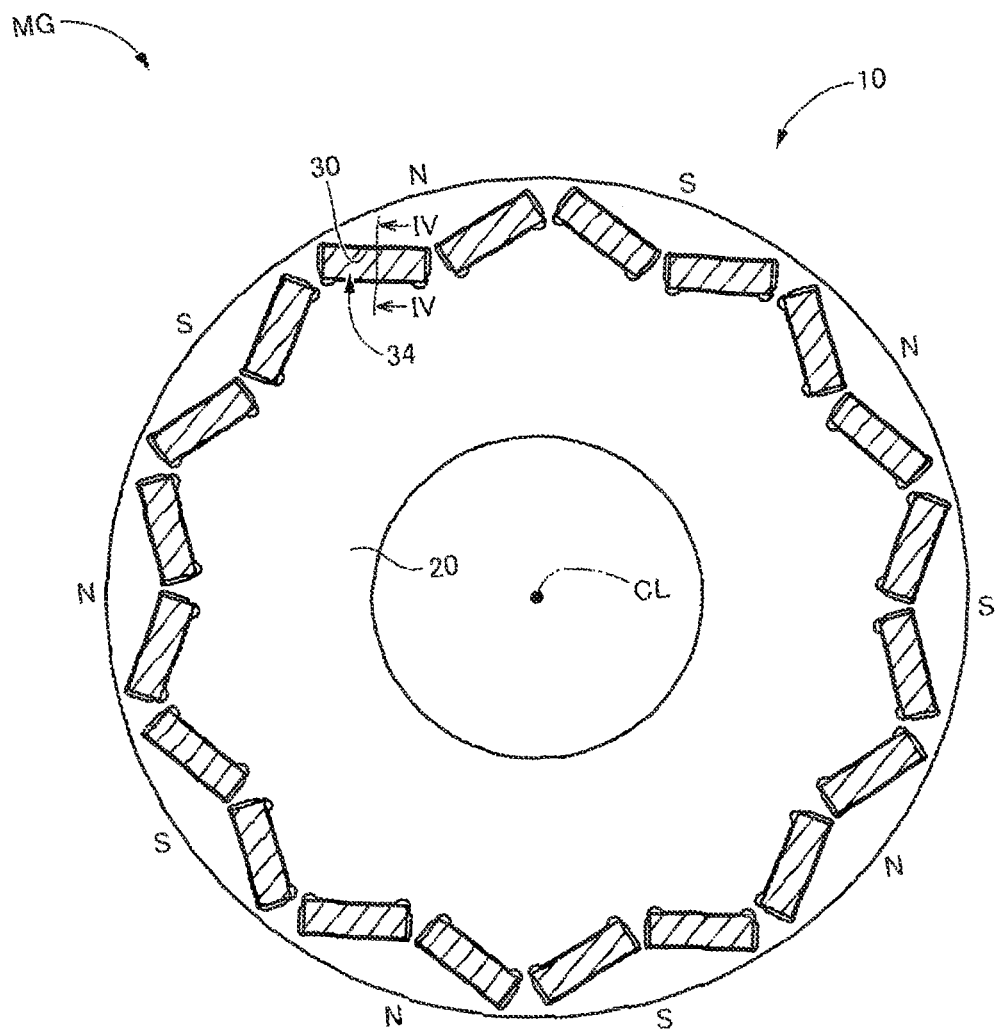
FIG. 1 is a cross sectional view for explaining a construction of a rotor to which the present invention is applied.

FIG. 1 is a cross sectional view for explaining a construction of a rotor 10 to which the present invention is applied, wherein the cross sectional view is taken in a plane perpendicular to an axis (center line) CL of the rotor 10. Hereinafter, a direction parallel to the axis CL will be simply referred to as "axis CL direction".

The rotor 10 is to be provided in a vehicle rotating electric machine MG that is installed in a hybrid vehicle or an electric vehicle so as to serve as a drive power source for driving the vehicle. The vehicle rotating electric machine MG is a rotating electric machine having a function serving as a motor and a function serving as a generator. That is, the vehicle rotating electric machine MG is a so-called motor generator. The vehicle rotating electric machine MG is an embedded-magnet-type rotating electric machine, and includes a stator (not shown) provided with an excitation winding coil, in addition to the rotor 10 in which permanent magnets 34 are embedded or inserted.

The rotor 10 has a cylindrical shape and its center corresponds to the above-described axis CL. The rotor 10 includes a rotor core 20 and the above-described permanent magnet 34.

The rotor core 20 has a cylindrical shape and its center corresponds to the above-described axis CL. The cylindrical-shaped rotor core 20 is constituted by, for example, a plurality of electrical steel sheets that are laminated on each other. The rotor core 20 has a plurality of through-holes or slots 30 elongated in the axis CL direction, so that a longitudinal direction of each of the slots 30 corresponds to the axis CL direction. Each of the slots 30 has, for example, a substantially oblong rectangle shape in its cross section perpendicular to the axis CL, and all of the slots 30 have the same cross sectional shape. It is noted that each of the slots 30 corresponds to "hole portion" recited in the appended claims.

In the rotor core 20, each adjacent two or each pair of the slots 30 are provided for a corresponding one of poles. In a cross section perpendicular to the axis CL, each pair of the slots 30 cooperate with each other to form an arcuate shape convex toward the axis CL in an outer peripheral portion of the rotor core 20. The pairs of the slots 30 are equi-angularly spaced in a circumferential direction around the axis CL of the rotor core 20. In the present embodiment, the slots 30 consist of 10 pairs of the slots 30 that are equi-angularly arranged at an angular interval of $2\pi/10$ [rad].

Each of the permanent magnets 34 has an elongated cuboid shape. The permanent magnets 34, which are to be inserted into the respective slots 30, are identical in shape with each other. Each of the permanent magnets 34 has, in its cross section perpendicular to its longitudinal direction, a shape slightly smaller than a shape of each of the slots 30 in its cross section perpendicular to its longitudinal direction (i.e., the axis CL direction), so that the permanent magnets 34 can be inserted into the respective slots 30. Each of the permanent magnets 34 is made of a magnetic material such as neodymium magnet and rare earth cobalt magnet, and is homogeneous in terms of composition in any portion of the permanent magnet 34.

In the rotor core 20, each pair of the permanent magnets 34 are inserted in a corresponding pair of the slots 30 such that each circumferentially adjacent pair of the poles consist of a pair of S and N poles and such that the S and N poles are alternately arranged in the circumferential direction.

Figure 2:
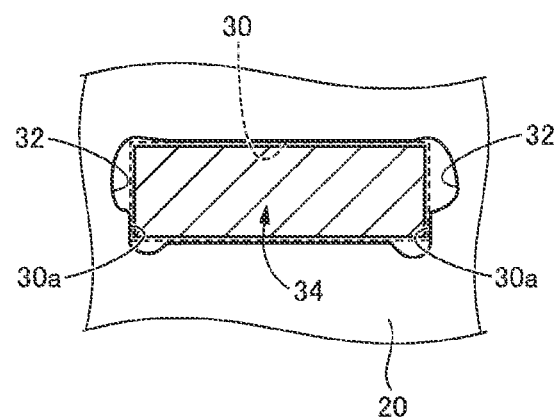
FIG. 2 is a cross sectional view of a slot and a permanent magnet inserted in the slot, wherein the cross sectional view is taken in a plane perpendicular to a longitudinal direction of each of the slot and the permanent magnet.

FIG. 2 is a cross sectional view of the slot 30 and the permanent magnet 34 inserted in the slot 30, wherein the cross sectional view is taken in a plane perpendicular to the longitudinal direction of each of the slot 30 and the permanent magnet 34.

As shown in FIG. 2, the slot 30 is a portion of the rotor core 20 into which the permanent magnet 34 is insertable. An inner wall surface of the slot 30 include portions serving as positioning portions 30a for positioning the permanent magnet 34 in a predetermined position upon insertion of the permanent magnet 34 into the slot 30. The cross section of the slot 30 perpendicular to the longitudinal direction is designed to be larger than the cross section of the permanent magnet 34 perpendicular to the longitudinal direction, so that gap is formed between the rotor core 20 and the permanent magnet 34 when the permanent magnet 34 has been inserted into the slot 30. Further, clearance portions 32 are provided to be adjacent to the slot 30. The clearance portions 32 remain free even when the permanent magnet 34 has been inserted into the slot 30, and cooperate with the above-described gap to constitute a space or spaces that are to be filled with an adhesive (e.g., resin) when the permanent magnet 34 has been inserted into the slot 30 whereby the permanent magnet 34 is fixed in the slot 30.

Figure 3:
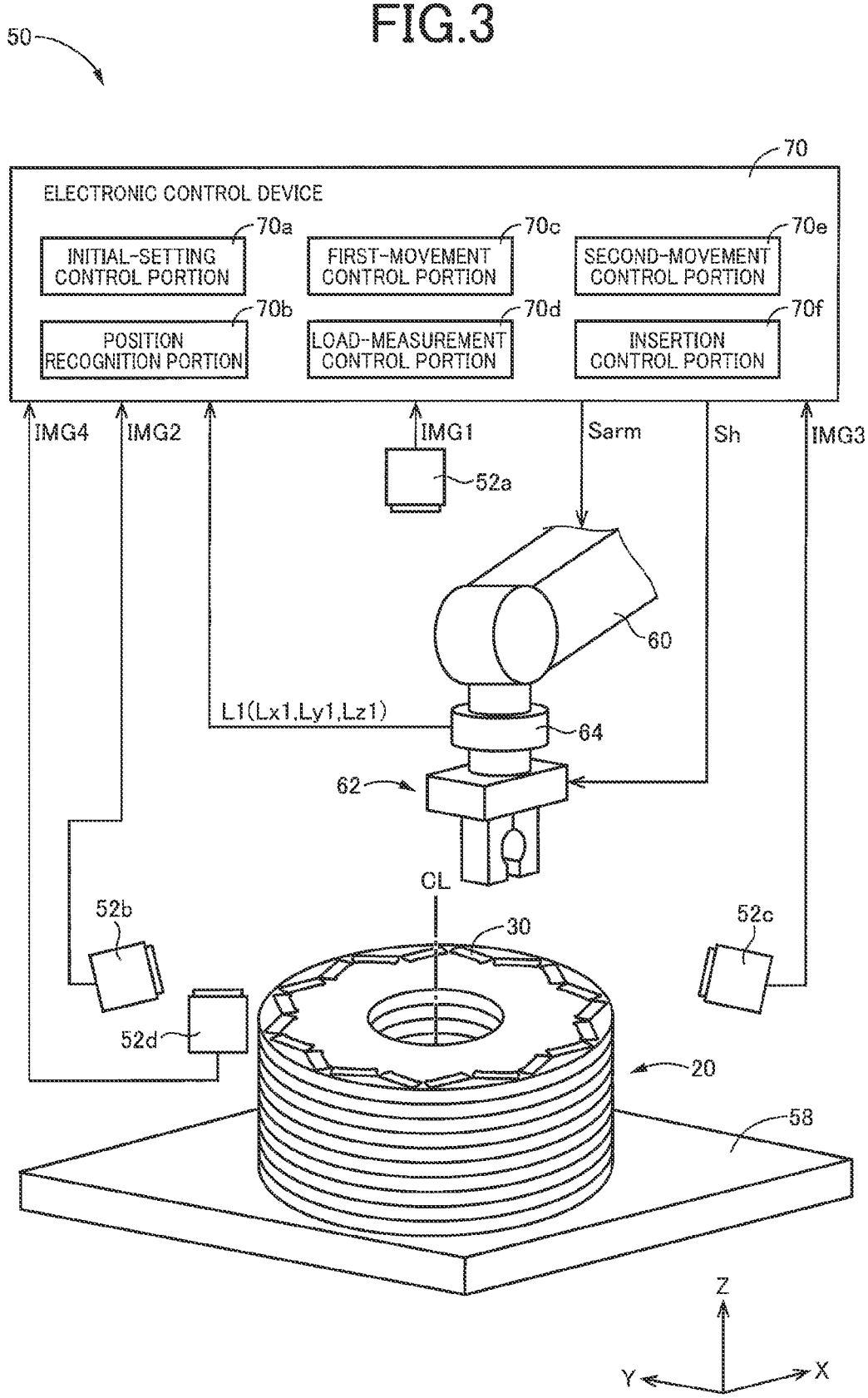
FIG. 3 is a view for explaining a construction of a rotor assembly apparatus that is to be used in a method of assembling the rotor, which is according to a first embodiment of the present invention, and also for explaining major portions of control functions that are provided to perform various control operations in the rotor assembly apparatus.

FIG. 3 is a view for explaining a construction of a rotor assembly apparatus 50 that is to be used in a method of assembling the rotor 10, which is according to a first embodiment of the present invention, and also for explaining major portions of control functions that are provided to perform various control operations in the rotor assembly apparatus 50. In FIG. 3, a Z-axis direction corresponds to a vertical direction, an X-axis direction corresponds to a horizontal direction, and a Y-axis direction corresponds to another horizontal direction and is perpendicular to the X-axis direction on a horizontal plane, for example.

The rotor assembly apparatus 50 includes cameras 52a, 52b, 52c, 52d, a table (fixing base) 58, a robot arm 60, a magnet holding portion 62, a load sensor 64 and an electronic control device 70.

The table 58 is a base on which the rotor core 20 is to be fixedly held. The table 58 serves as a core holding portion (core holding means) configured to fixedly hold the rotor core 20 such that the rotor core 20 is unmovable relative to the table 58. Meanwhile, the magnet holding portion 62 is provided in a distal end portion of the robot arm 60, such that the permanent magnet 34 is to be clamped and held by the magnet holding portion 62 (see FIGS. 4A to 4D). The magnet holding portion 62 serves as a magnet holding portion (magnet holding means) configured to fixedly hold the permanent magnet 34 such that the permanent magnet 34 is unmovable relative to the magnet holding portion 62.

The load sensor 64 is fixed to the magnet holding portion 62, and is constituted by a strain sensor, for example. The load sensor 64 is configured to measure a load Lx1 [N], a load Ly1 [N] and a load Lz1 [N] that act in the respective X-axis direction, Y-axis direction and Z-axis direction and are applied to the permanent magnet 34 held by the magnet holding portion 62. The measured load Lx1, load Ly1 and load Lz1 are respective components of a load L1 [N] applied to the permanent magnet 34. That is, the measured load Lx1, load Ly1 and load Lz1 are the respective components of the load L1 that act in the respective X-axis direction, Y-axis direction and Z-axis direction. The load L1 [N] as a vector quantity corresponds to "load" recited in the appended claims.

The camera 52a is disposed in a position that is to be located right above the rotor core 20 disposed on the table 58, for example, and is configured to take images of the rotor core 20 and the robot arm 60 from an upper side in the vertical direction. The cameras 52b, 52c configured to take images of the rotor core 20 and the permanent magnet 34 from respective different horizontal directions that correspond to the X-axis direction and the Y-axis direction, respectively, for example. The camera 52d is configured to take images of the magnet holding portion 62 and the permanent magnet 34 held by the magnet holding portion 62 from a lower side in the vertical direction, for example.

The robot arm 60 is a kind of mechanical arm that is to be moved in a manner similar to movement of a human arm, and movement of the robot arm 60 is to be controlled by the electronic control device 70. The robot arm 60 is capable of being moved vertically (Z-axis direction) and horizontally (X-axis, Y-axis directions) on a horizontal plane, and being rotated in a horizontal plane. That is, the robot arm 60 and the magnet holding portion 62 (that is provided in the distal end portion of the robot arm 60) are movable linearly and rotatively, relative to the table 58. The magnet holding portion 62 and the permanent magnet 34 (that is to be fixed to the magnet holding portion 62, unmovably relative to the magnet holding portion 62) are to be moved by the robot arm 60 whereby a position of the permanent magnet 34 relative to the table 58 is changed. Thus, the robot arm 60 is capable of linearly moving the permanent magnet 34 horizontally, upwardly and downwardly, and also rotatively moving (rotating) the permanent magnet 34, so as to position the permanent magnet 34 into an arbitrary or desired position relative to the table 58 and the rotor core 20 that is to be fixedly held on the table 58.

The electronic control device 70 includes a so-called microcomputer incorporating a CPU, a ROM, a RAM and an input-output interface, for example. The CPU is configured to control the movement of the robot arm 60, by processing various input signals, according to control programs stored in the ROM, while utilizing a temporary data storage function of the RAM. It is noted that the electronic control device 70 corresponds to "control device" recited in the appended claims.

The electronic control device 70 is configured to receive image information or data IMG1, IMG2, IMG3, IMG4 that are data of the images taken by the respective cameras 52a, 52b, 52c, 52d and also data of the loads Lx1, Ly1, Lz1 measured by the load sensor 64. Further, the electronic control device 70 is configured to output an arm control signal Sarm for controlling the movement of the robot arm 60, and also a magnet-holding control signal Sh for controlling holding and release of the permanent magnet 34, such that the arm control signal Sarm and the magnet-holding control signal Sh are supplied to the robot arm 60 and the magnet holding portion 62, respectively.

The electronic control device 70 functionally includes an initial-setting control portion 70a, a position recognition portion 70b, a first-movement control portion 70c, a load-measurement control portion 70d, a second-movement control portion 70e and an insertion control portion 70f. The control functions of the electronic control device 70 will be described with reference to FIGS. 4A to 4D.

Figure 4A:
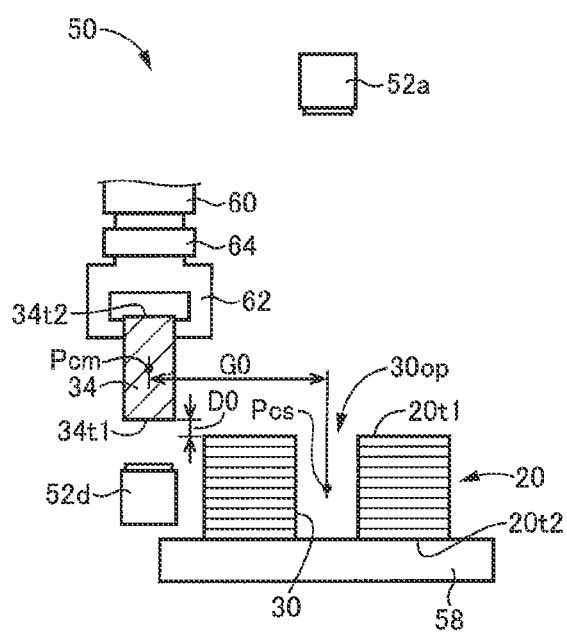
FIGS. 4A to 4D are a set of views for explaining the method of assembling the rotor by using the rotor assembly apparatus shown in FIG. 3, wherein the view of FIG. 4A is for explaining a state in which an initial setting is made prior to insertion of the permanent magnet into the slot, the view of FIG. 4B is for explaining a first moving step, the view of FIG. 4C is for explaining a load measuring step and the view of FIG. 4D is for explaining a second moving step.
Figure 4B:
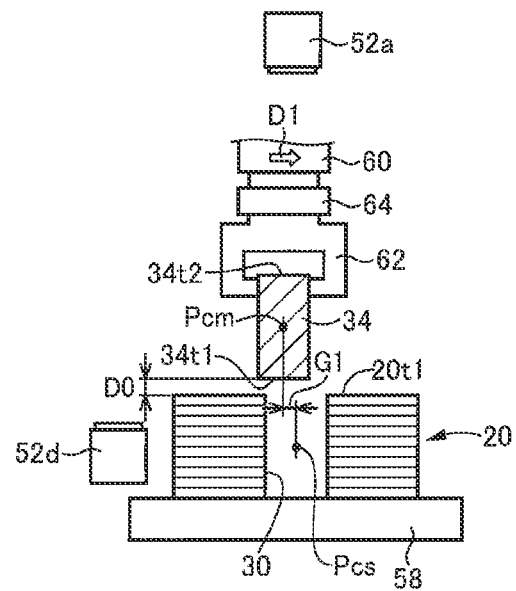
Figure 4C:
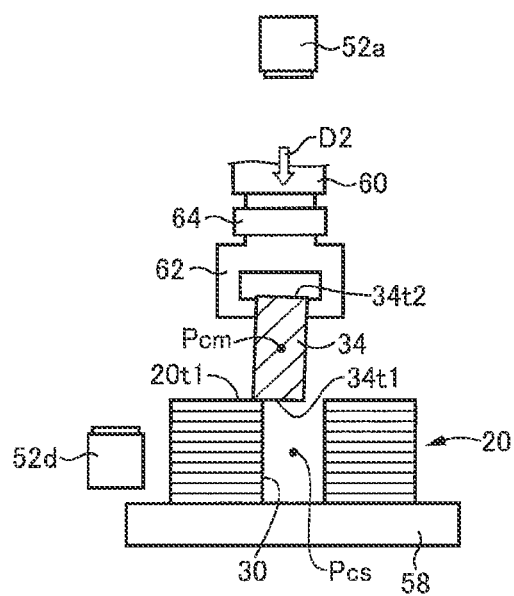
Figure 4D:
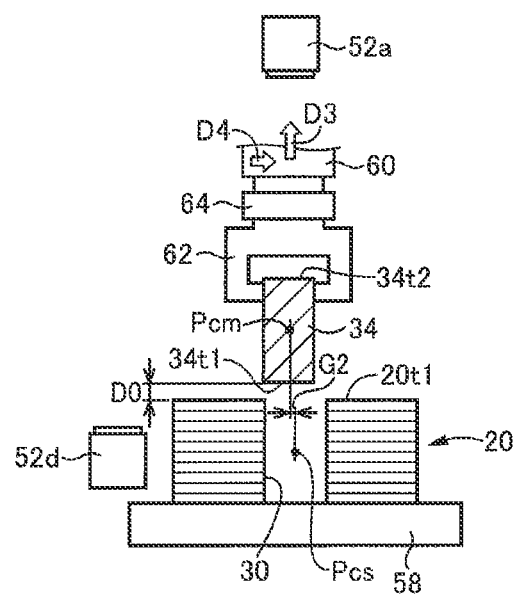

FIGS. 4A to 4D are a set of views for explaining the method of assembling the rotor 10 by using the rotor assembly apparatus 50 shown in FIG. 3, wherein the view of FIG. 4A is for explaining a state in which an initial setting is made prior to insertion of the permanent magnet 34 into the slot 30, the view of FIG. 4B is for explaining a first moving step, the view of FIG. 4C is for explaining a load measuring step and the view of FIG. 4D is for explaining a second moving step. FIGS. 4A to 4D shows the slot 30 that is one of the plurality of slots 30 provided in the rotor core 20, and the permanent magnet 34 that is to be inserted into the slot 30. Each of the views of FIGS. 4A to 4D are a cross sectional view taken in a plane indicated by arrows IV in FIG. 1. In each of the views of FIGS. 4A to 4D, an up-down direction and a right-left direction on its drawing sheet correspond to the vertical direction and the horizontal direction, respectively.

The method of assembling the rotor 10, i.e., a method of inserting the permanent magnet 34 into the slot 30, includes an initial setting step, a position recognizing step, a first moving step, a load measuring step, a second moving step and an inserting step.

Firstly, as shown in the view of FIG. 4A, in the initial setting prior to insertion of the permanent magnet 34 into the slot 30, the rotor core 20 is fixed onto the table 58 while the permanent magnet 34 is attached to the magnet holding portion 62.

The rotor core 20 is fixedly held on the table 58 such that the axis CL of the rotor core 20 is parallel to the vertical direction, so that each of the slots 30 provided in the rotor core 20 is elongated or extends in the vertical direction, i.e., the axis CL direction. The rotor core 20 has axially opposite end portions, one of which is located on an upper side of the other, with the rotor core 20 being fixedly held on the table 58. In the following description, the upper one of the axially opposite end portions of the rotor core 20 will be referred to as an axial end portion 20t1, while the other of the axially opposite end portions of the rotor core 20 will be referred to as another axial end portion 20t2. Each of the slots 30 has an opening 30op in the axial end portion 20t1.

On the other hand, the permanent magnet 34 is clamped and held by the magnet holding portion 62 such that the longitudinal direction of the permanent magnet 34 is parallel to the vertical direction, so that the permanent magnet 34 held by the magnet holding portion 62 is elongated or extends in the vertical direction, i.e., the axis CL direction. The permanent magnet 34 has longitudinally opposite end portions, one of which is located on a lower side of the other, with the permanent magnet 34 being held by the magnet holding portion 62. In the following description, the lower one of the longitudinally opposite end portions of the permanent magnet 34 will be referred to as a longitudinal end portion 34t1, while the other of the longitudinally opposite end portions of the permanent magnet 34 will be referred to as another longitudinal end portion 34t2. In the initial setting, the axial end portion 20t1 of the rotor core 20 and the longitudinal end portion 34t1 of the permanent magnet 34 are distant from each other by a vertical clearance distance D0 [mm] in the vertical direction. It is noted that the axis CL corresponds to "axis" recited in the appended claims. The axis CL direction, i.e., the vertical direction corresponds to a direction in which the permanent magnet 34 is to be inserted into the slot 30.

A magnet center position Pcm, which is a position of center of the permanent magnet 34, corresponds to a center of gravity of the permanent magnet 34, for example. A slot center position Pcs, which is a position of center of the slot 30, corresponds to a center of gravity of the slot 30, for example, in case of assuming that the slot 30 is filled with a homogeneous substance. With the magnet center position Pcm and the slot center position Pcs being aligned with each other as seen in the vertical direction, the permanent magnet 34 is smoothly insertable into the slot 30.

In the initial setting, once after the rotor core 20 has been fixed onto the table 58, each time after one of the permanent magnets 34 has been inserted into a corresponding one of the slots 30, a next one of the permanent magnets 34 is attached to the magnet holding portion 62 so as to be inserted into another one of the slots 30.

The initial-setting control portion 70a implements the initial setting step of making the above-described initial setting. For example, the initial-setting control portion 70a causes the magnet holding portion 62 to hold the permanent magnet 34, and causes the robot arm 60 to be moved to a position that enables the camera 52a to take an image of shape of the slot 30 into which the permanent magnet 34 is to be inserted, namely, to a position that does not obstacle the camera 52a from photographing the slot 30. Thus, the magnet holding portion 62 holding the permanent magnet 34 is moved to a predetermined position relative to the slot 30. The predetermined position, to which the magnet holding portion 62 is moved, is also a position that enables the permanent magnet 34 to be photographed from a lower side by the camera 52d.

After the initial setting step, the position recognition portion 70b implements the position recognizing step of recognizing the slot center position Pcs, the magnet center position Pcm and the vertical clearance distance D0. The position recognition portion 70b calculates or recognizes the slot center position Pcs, based on an image data IMG1 representing the image of the shape of the slot 30 taken by the camera 52a in an initial state. The slot center position Pcs is coincident with an area center (geometric center of gravity) of the opening 30op, as seen in the vertical direction. Thus, the position recognition portion 70b can calculate the slot center position Pcs based on the image data IMG1 representing the shape of the opening 30op of the slot 30. Further, the position recognition portion 70b calculates or recognizes the magnet center position Pcm and the vertical clearance distance D0, based on image data IMG2, IMG3 representing the images of the shapes of the permanent magnet 34 and the rotor core 20 taken by the cameras 52b, 52c (see FIG. 3). Since the permanent magnet 34 is homogeneous in composition, the position recognition portion 70b can calculate the magnet center position Pcm, based on the shape of the permanent magnet 34. Further, the position recognition portion 70b calculates or recognizes a fixing error of the permanent magnet 34 by the magnet holding portion 62 (i.e., positional deviation or inclination of the permanent magnet 34 fixedly held by the magnet holding portion 62, relative to the magnet holding portion 62), based on an image data IMG4 representing the image of the shape of the permanent magnet 34 taken by the camera 52d. From the slot center position Pcs, the magnet center position Pcm and the fixing error that are recognized by the position recognition portion 70b, an initial offset distance G0, which is a horizontal distance from the magnet center position Pcm to the slot center position Pcs in the initial state as seen in the vertical direction, is recognized by the position recognition portion 70b.

It is noted that the position recognition portion 70b recognizes the position of the robot arm 60 relative to the table 58 in the initial state, through the arm control signal Sarm (by which the movement of the robot arm 60 is controlled), so that the position recognition portion 70b can recognize the initial offset distance G0 and the vertical clearance distance D0, also based on the recognized position of the robot arm 60 relative to the table 58 in the initial state.

As shown in the view of FIG. 4B, after the position recognizing step, the first-movement control portion 70c implements the first moving step of moving the permanent magnet 34 in a horizontal direction (i.e., direction indicated by arrow D1) such that the longitudinal end portion 34t1 becomes opposed to the opening 30op. At the first moving step, the permanent magnet 34 is horizontally moved by the first-movement control portion 70c, to a position in which the cross sectional shape of the magnet 34 (i.e., the shape of the cross section perpendicular to the longitudinal direction of the permanent magnet 34) is included within the cross sectional shape of the opening 30op, as seen in the vertical direction, namely, to a position in which an entirety of the cross section of the magnet 34 overlaps with the cross section of the opening 30op, as seen in the vertical direction. More specifically described, at the first moving step, the permanent magnet 34 is moved by the first-movement control portion 70c, such that the magnet center position Pcm and the slot center position Pcs, which have been recognized by the position recognition portion 70b, are made aligned with each other as seen in the vertical direction, and such that the permanent magnet 34 is not rotated and the permanent magnet 34 is not deviated from a predetermined angular position relative to the slot 30 about the magnet center position Pcm and the slot center position Pcs that are aligned with each other.

By the way, as described above, the initial offset distance G0 and the vertical clearance distance D0 can be recognized in the electronic control device 70, based on the information or data representing to the recognized position of the robot arm 60 relative to the table 58 in the initial state. However, even though the position of the robot arm 60 relative to the table 58 in the initial state is always the same, the position of the permanent magnet 34 relative to the magnet holding portion 62 is likely to vary, for example, by about several μm to several tens μm, each time when the permanent magnet 34 is attached to the magnet holding portion 62 to be held by the magnet holding portion 62. Further, the initial offset distance G0 recognized by the position recognition portion 70b could contain a recognition error, i.e., a difference of the recognized position of the permanent magnet 34 relative to the slot 30 (which is recognized based on the image data IMG1, IMG2, IMG3, IMG4), from an actual position of the permanent magnet 34 relative to the slot 30. At the first moving step, the permanent magnet 34 is horizontally moved so as to reduce the initial offset distance G0 recognized by the position recognition portion 70*b*, and an inclination of the magnet holding portion 62 holding the permanent magnet 34 is changed or corrected so as to reduce the above-described fixing error (inclination). However, even after the first moving step, a positional deviation G [µm] of the magnet center position Pcm from the slot center position Pcs as seen in the vertical direction is likely to remain as a positional deviation amount G1 depending on the fixing error and the recognition error. It is noted that the above-described positional deviation G, which is a deviation of the magnet center position Pcm from the slot center position Pcs as seen in the vertical direction after the first moving step, corresponds to "positional deviation between the permanent magnet and the hole portion, as seen in the direction parallel to the axis", which is recited in the appended claims. It is further noted that the positional deviation G as seen in the vertical direction may be expressed also as the positional deviation G as seen in a horizontal direction that is perpendicular to the vertical direction.

FIGS. 4A to 4D shows, by way of example, a case in which the slot center position Pcs and the magnet center position Pcm are deviated from each other, after the first moving step, as seen in the vertical direction, only in the right-left direction on the drawing sheet by the positional deviation amount G1, for easier understanding of the invention.

As shown in the view of FIG. 4C, after the first moving step, the load-measurement control portion 70*d* implements the load measuring step of measuring the load L1 applied to the permanent magnet 34, by moving the permanent magnet 34 in the vertical direction toward the opening 30*op*, namely, in a an approaching direction (indicated by arrow D2) that brings the longitudinal end portion 34*t*1 into approximation with the opening 30*op*. Specifically, the permanent magnet 34 is moved downwardly by the robot arm 60 by a distance (=D0+δ) that is slightly larger than the vertical clearance distance D0 in the initial state, wherein δ [µm] is a positive value that is close to zero. This distance slightly larger than the vertical clearance distance D0 is a distance that causes the longitudinal end portion 34*t*1 to be brought into contact with the rotor core 20 in a case in which the slot center position Pcs and the magnet center position Pcm are deviated from each other, as seen in the vertical direction, to a degree that impedes insertion of the permanent magnet 34 into the slot 30. During movement (downward movement) of the permanent magnet 34 at the load measuring step, the load L1 applied to the permanent magnet 34 is constantly measured by the load sensor 64. At the load measuring step, when the load L1 exceeds a predetermined load limit Llmt1 [N], the load-measurement control portion 70*d* stops or suspends movement (downward movement) of the permanent magnet 34. The load limit Llmt1 is a predetermined determination value that is obtained by experimentation or determined by an appropriate design theory, so as to determine whether an amount of the deformation of the permanent magnet 34 and the rotor core 20 caused by contact of permanent magnet 34 and the rotor core 20 is within a tolerable range or not. In the present embodiment, the load L1 is compared with the predetermined load limit Llmt1, and the movement of the permanent magnet 34 is suspended when the load L1 exceeds the predetermined load limit Llmt1. However, predetermined load limits may be set for the respective loads Lx1, Ly1, Lz1 measured by the load sensor 64, such that the movement of the permanent magnet 34 is suspended when at least one of the loads Lx1, Ly1, Lz1 exceeds a corresponding one of the load limits.

At the load measuring step, in a case in which the permanent magnet 34 has been downwardly moved by the above-described distance (=D0+δ) that is slightly larger than the vertical clearance distance D0, without the measured load L1 exceeding the load limit Llmt1, it is regarded that the longitudinal end portion 34*t*1 of the permanent magnet 34 has started to be inserted into the slot 30 without the amount of the deformation of the permanent magnet 34 and the rotor core 20 exceeding the tolerable range.

At the load measuring step, in a case in which the measured load L1 has exceeded the load limit Llmt1, it is regraded that the longitudinal end portion 34*t*1 of the permanent magnet 34 has been brought into contact with the rotor core 20, and the longitudinal end portion 34*t*1 has not been inserted into the slot 30. The load L1, which is caused upon contact of the permanent magnet 34 with the rotor core 20, is a force applied from the rotor core 20 to the permanent magnet 34 that is held by the magnet holding portion 62 provided with the load sensor 64.

As shown in the view of FIG. 4D, after the load measuring step, the second-movement control portion 70*e* implements the second moving step. The second-movement control portion 70*e* calculates a vector of the load L1, based on the direction and amount of each of the loads Lx1, Ly1, Lz1, and calculates a direction in which a force is applied to the permanent magnet 34 from the rotor core 20. Thus, it is possible to determine a portion of the permanent magnet 34 which has been brought into contact with the rotor core 20. The second moving step includes two sub-steps consisting of a separating step and a position correcting step. The separating step is a sub-step of moving the permanent magnet 34 in the vertical direction away from the slot 30, namely, in a direction (indicated by arrow D3) that causes the longitudinal end portion 34*t*1 to be separated from the opening 30*op*. The separating step is followed by the position correcting step that is another sub-step of moving the permanent magnet 34 in a horizontal direction (indicated by arrow D4) that reduces the positional deviation G, based on the data relating to the load L1 measured at the load measuring step.

At the separating step, which is implemented when the load L1 has exceeded the load limit Llmt1, the permanent magnet 34 is upwardly moved, for example, by a distance that is substantially equal to a distance by which the permanent magnet 34 has been downwardly moved at the load measuring step, so that the axial end portion 20*t*1 and the longitudinal end portion 34*t*1 are separated from each other as in the initial state.

At the position correcting step, the permanent magnet 34 is moved, for example, in a manner described below. At the load measuring step, a direction of a horizontal component of the load L1 applied to the permanent magnet 34 from the rotor core 20 is substantially the same as a direction away from the magnet center position Pcm toward the slot center position Pcs. The second-movement control portion 70*e* reduces the positional deviation G, by moving the permanent magnet 34 by a predetermined distance d [µm] in the above-described direction of the horizontal component of the load L1, so that the positional deviation G is reduced to a positional deviation amount G2 (<G1) after the second moving step, as shown in the view of FIG. 4D, for example.

It is noted that the predetermined distance d is a distance which is obtained by experimentation or determined by an appropriate design theory, and which is smaller than the above-described fixing error and recognition error. It is further noted that the above-described direction of the horizontal component of the load L1 is a direction dependent on the amounts of the respective load Lx1 and load Ly1 that are two components of the load L1 which act in respective two directions perpendicular to each other and perpendicular to the axis CL, namely, a direction that can be determined based on the amounts of the respective load Lx1 and load Ly1.

The above-described load measuring step and the second moving step are implemented repeatedly as needed, after the first moving step and before the inserting step described below. With the load measuring step and the second moving step being implemented repeatedly a plurality of times, the positional deviation G is gradually reduced.

In a case in which the load L1 measured at the load measuring step does not exceed the predetermined load limit Llmt1, the insertion control portion 70f implements the inserting step of inserting the permanent magnet 34 into the slot 30, by moving the permanent magnet 34 downwardly in the vertical direction, i.e., in a direction same as the above-described approaching direction by which the longitudinal end portion 34t1 is brought into approximation with the opening 30op for measuring the load L1 at the load measuring step implemented by the load-measurement control portion 70d. As a result of the second moving step implemented shortly before the inserting step, the positional deviation G is reduced whereby the load L1 applied to the permanent magnet 34 during the downward movement of the permanent magnet 34 becomes not larger than the load limit Llmt1, so that the permanent magnet 34 can be smoothly inserted into the slot 30 without the amount of the deformation of the permanent magnet 34 and the rotor core 20 exceeding the tolerable range at the inserting step.

Figure 5:
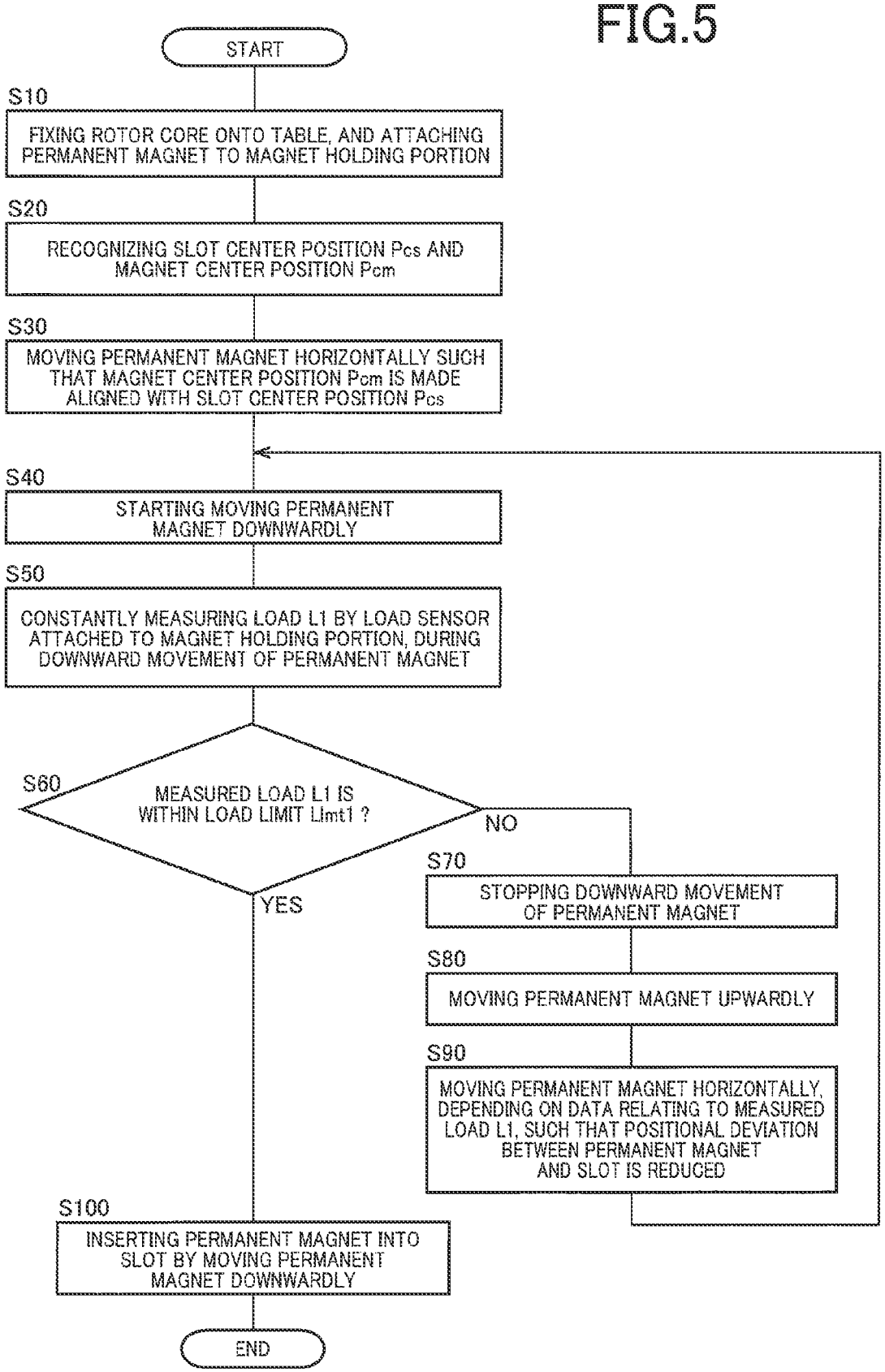
FIG. 5 is a flow chart for explaining steps of the method of assembling the rotor, by showing, by way of example, a main part of a control routine executed by an electronic control device for the rotor assembly apparatus for assembling the rotor.

FIG. 5 is a flow chart for explaining steps of the method of assembling the rotor 10, by showing, by way of example, a main part of a control routine executed by the electronic control device 70 of the rotor assembly apparatus 50 for assembling the rotor 10.

This control routine is initiated with step S10 as the initial setting step corresponding to function of the initial-setting control portion 70a, which is implemented to fix the rotor core 20 onto the table 58, and to attach the permanent magnet 34 to the magnet holding portion 62. Step S10 is followed by step S20 as the position recognizing step corresponding to function of the position recognition portion 70b, which is implemented to recognize the slot center position Pcs, the magnet center position Pcm, the vertical clearance distance D0 and the fixing error, based on the image data IMG1, IMG2, IMG3, IMG4 representing the images taken by the cameras 52a, 52b, 52c, 52d. Step S20 is followed by step S30 as the first moving step corresponding to function of the first-movement control portion 70c, which is implemented to horizontally move the permanent magnet 34 such that the magnet center position Pcm is made aligned with the slot center position Pcs as seen in the vertical direction. That is, at step S30, the permanent magnet 34 is moved such that the initial offset distance G0 recognized at step S20 is reduced. Step S30 is followed by step S40.

At step S40 as the load measuring step corresponding to function of the load-measurement control portion 70d, the permanent magnet 34 starts to be moved downwardly. Step S40 is followed by step S50 as the load measuring step corresponding to function of the load-measurement control portion 70d, which is implemented to constantly measure the load L1 by the load sensor 64 attached to the magnet holding portion 62, during downward movement of the permanent magnet 34. Step S50 is followed by step S60 as the load measuring step corresponding to function of the load-measurement control portion 70d, which is implemented to determine whether the load L1 measured at step S50 is within the load limit Llmt1 or not. When an affirmative determination is made at step S60, the control flow goes to step S100. When a negative determination is made at step S60, the control flow goes to step S70 as the load measuring step corresponding to function of the load-measurement control portion 70d, which is implemented to stop the downward movement of the permanent magnet 34. Step S70 is followed by step S80.

At step S80 as the separating step of the second moving step corresponding to function of the second-movement control portion 70e, the permanent magnet 34 is moved upwardly. Step S80 is followed by step S90 as the position correcting step of the second moving step corresponding to function of the second-movement control portion 70e, which is implemented to horizontally move the permanent magnet 34, depending on data relating to the load L1 measured at step S50, such that the positional deviation G is reduced. After step S90, step S40 is implemented again. It is noted that the data relating to the load L1 include not only the amount of the load L1 but also the direction of the load L1 (i.e., direction in which the load L1 acts), wherein the amount and direction of the load L1 are calculated based on amounts of the respective load Lx1, load Ly1 and load Lz1 which act in the respective X-axis direction, Y-axis direction and Z-axis direction and which are measured by the load sensor 64.

At step S100 as the inserting step corresponding to function of the insertion control portion 70f, the permanent magnet 34 is downwardly moved and is inserted into the slot 30. After step S100, one cycle of execution of the control routine is terminated.

The method of assembling the rotor 10 according to the present embodiment includes: (a) the first moving step of horizontally moving the permanent magnet 34 such that the longitudinal end portion 34t1 (i.e., an end portion of the permanent magnet 34 in the longitudinal direction parallel to the axis CL direction) is positioned to be opposed to the opening 30op of the slot 30; (b) the load measuring step of, after the first moving step, downwardly moving the permanent magnet 34 toward the rotor core 20 in the approaching direction that is parallel to the axis CL direction, and measuring the load L1 applied to the permanent magnet 34, by the load sensor 64, when the longitudinal end portion 34t1 of the permanent magnet 34 is brought into contact with the rotor core 20; (c) the second moving step of, after the load measuring step, moving the permanent magnet 34 so as to change the position of the permanent magnet 34 relative to the rotor core 20, depending on the data relating to the load L1 measured at the load measuring step, such that the positional deviation G between the slot center position Pcs and the magnet center position Pcm, as seen in vertical direction, is reduced; and (d) the inserting step of, after the second moving step, inserting the permanent magnet 34 into the slot 30, by downwardly moving the permanent magnet 34 relative to the rotor core 20 in the direction same as the approaching direction in which the longitudinal end portion 34t1 becomes close to the opening 30op. Further, the electronic control device 70 for the rotor assembly apparatus 50 according to the present embodiment includes: (a) the first-movement control portion 70c configured to move the permanent magnet 34 relative to the rotor core 20, such that the longitudinal end portion 34t1 of the permanent magnet 34 is positioned to be opposed to the opening 30op of the slot 30; (b) the load-measurement control portion 70d configured, after the permanent magnet 34 is moved by the first-movement control portion 70c, to downwardly move the permanent magnet 34 toward the rotor core 20 in the approaching direction that is parallel to the axis CL direction, and to measure the load L1 applied to the permanent magnet 34, by the load sensor 64, when the longitudinal end portion 34t1 of the permanent magnet 34 is brought into contact with the rotor core 20; (c) the second-movement control portion 70e configured, after the load L1 is measured by the load-measurement control portion 70d, to move the permanent magnet 34 so as to change the position of the permanent magnet 34 relative to the rotor core 20, depending on the data relating to the load L1 measured by the load-measurement control portion 70d, such that the positional deviation G between the permanent magnet 34 and the slot 30, which is as seen in the vertical direction, is reduced; and (d) the insertion control portion 70f configured, after the permanent magnet 34 is moved by the second-movement control portion 70e, to insert the permanent magnet 34 into the slot 30, by moving the permanent magnet 34 relative to the rotor core 20 in the direction same as the approaching direction in which the longitudinal end portion 34t1 becomes close to the opening 30op.

The position of the permanent magnet 34 relative to the rotor core 20 is corrected by implementations of the load measuring step corresponding to function of the load-measurement control portion 70d and the second moving step corresponding to function of the second-movement control portion 70e, such that the positional deviation G between the slot center position Pcs and the magnet center position Pcm, as seen in the vertical direction, is reduced, whereby the reduction of the insertability of the permanent magnet 34 is suppressed even if the cross section of the slot 30 perpendicular to the longitudinal direction of the slot 30 is reduced in area, as compared with a method without the load measuring step and the second moving step, namely, as compared with an arrangement without the load-measurement control portion 70d and the second-movement control portion 70e. Thus, it is possible to reduce the gap between the rotor core 20 and the permanent magnet 34 while suppressing the reduction of the insertability of the permanent magnet 34 into the slot 30 of the rotor core 20, and accordingly to improve performance of the vehicle rotating electric machine MG.

In the method of assembling the rotor 10 according to the present embodiment, the second moving step is implemented when the load L1 measured at the load measuring step exceeds the predetermined load limit Llmt1, and the inserting step is implemented when the load L1 measured at the load measuring step does not exceed the predetermined load limit Llmt1. Further, in the electronic control device 70 for the rotor assembly apparatus 50 according to the present embodiment, the permanent magnet 34 is moved by the second-movement control portion 70e, so as to change the position of the permanent magnet 34 relative to the rotor core 20, when the load L1 measured by the load-measurement control portion 70d exceeds the predetermined load limit Llmt1, and the permanent magnet 34 is inserted into the slot 30 by the insertion control portion 70f when the load L1 measured by the load-measurement control portion 70d does not exceed the predetermined load limit load limit Llmt1.

That is, when the measured load L1 exceeds the predetermined load limit Llmt1, the position of the permanent magnet 34 relative to the rotor core 20 is corrected. When the measured load L1 does not exceed the predetermined load limit Llmt1, the load measuring step is followed by the inserting step whereby the permanent magnet 34 is inserted into the slot 30 immediately after implementation of the load measuring step.

In the method of assembling the rotor 10 according to the present embodiment, when the load L1 measured at the load measuring step exceeds the predetermined load limit Llmt1, the movement of the permanent magnet 34 toward the rotor core 20 is stopped or suspended at the load measuring step. Further, in the electronic control device 70 for the rotor assembly apparatus 50 according to the present embodiment, when the load L1 measured by the load-measurement control portion 70d exceeds the predetermined load limit Llmt1, the movement of the permanent magnet 34 toward the rotor core 20 (i.e., in the approaching direction in which the longitudinal end portion 34t1 becomes close to the opening 30op) by the load-measurement control portion 70d is stopped or suspended.

That is, when the measured load L1 exceeds the predetermined load limit Llmt1, the downward movement of the permanent magnet 34 toward the rotor core 20 is suspended, whereby the deformation of the permanent magnet 34 and the rotor core 20, which could be caused by contact of the permanent magnet 34 and the rotor core 20, can be suppressed. Thus, it is possible to suppress the reduction of the insertability of the permanent magnet 34 into the slot 30 while suppressing the deformation of the permanent magnet 34 and the rotor core 20, namely, improving the performance of the vehicle rotating electric machine MG.

In the method of assembling the rotor 10 according to the present embodiment, the second moving step is implemented a plurality of times, after the first moving step and before the inserting step. Further, in the electronic control device 70 for the rotor assembly apparatus 50 according to the present embodiment, the movement of the permanent magnet 34 is repeated a plurality of times by the second-movement control portion 70e, before the insertion of the permanent magnet 34 into the slot 30 by the insertion control portion 70f.

With the second moving step corresponding to function of the second-movement control portion 70e being implemented the plurality of times, the correction of the position of the permanent magnet 34 relative to the rotor core 20 is made repeated times so as to reduce the positional deviation G. Therefore, the reduction of the insertability of the permanent magnet 34 is suppressed even if the cross section of the slot 30 perpendicular to the longitudinal direction is reduced in area, as compared with a method in which the second moving step is not implemented repeated times. Further, it is possible to reduce the gap between the rotor core 20 and the permanent magnet 34 and accordingly to further improve performance of the vehicle rotating electric machine MG.

In the method of assembling the rotor 10 according to the present embodiment, at the first moving step, the permanent magnet 34 is moved so as to change the position of the permanent magnet 34 relative to the rotor core 20, depending on the image data IMG1, IMG2, IMG3, IMG4 representing the images of the slot 30 and the permanent magnet 34 which are taken by the cameras 52a, 52b, 52c, 52d. Further, in the electronic control device 70 for the rotor assembly apparatus 50 according to the present embodiment, the first-movement control portion 70c is configured to move the permanent magnet 34 so as to change the position of the permanent magnet 34 relative to the rotor core 20, depending on the image data IMG1, IMG2, IMG3, IMG4 representing images of the slot 30 and the permanent magnet 34 which are taken by the cameras 52a, 52b, 52c, 52d.

Thus, in the arrangement in which the permanent magnet 34 is moved depending on the image data IMG1, IMG2, IMG3, IMG4 representing the images taken by the cameras 52a, 52b, 52c, 52d, the position of the permanent magnet 34 relative to the slot 30 can be accurately recognized as compared with an arrangement in which the permanent magnet 34 is moved without depending on the image data IMG1, IMG2, IMG3, IMG4. Thus, the positional deviation G (positional deviation amount G1 in the present embodiment) between the permanent magnet 34 and the slot 30, as seen in the vertical direction, after implementation of the first moving step, can be made relatively small. Therefore, as compared with the arrangement in which the permanent magnet 34 is moved without depending on the image data IMG1, IMG2, IMG3, IMG4 representing the images taken by the cameras 52a, 52b, 52c, 52d, the positional deviation G between the permanent magnet 34 and the slot 30, as seen in the vertical direction, can be quickly made small, and the insertion of the permanent magnet 34 can be made quickly even if the cross section of the slot 30 perpendicular to the longitudinal direction is reduced in area.

Second Embodiment

Figure 6:
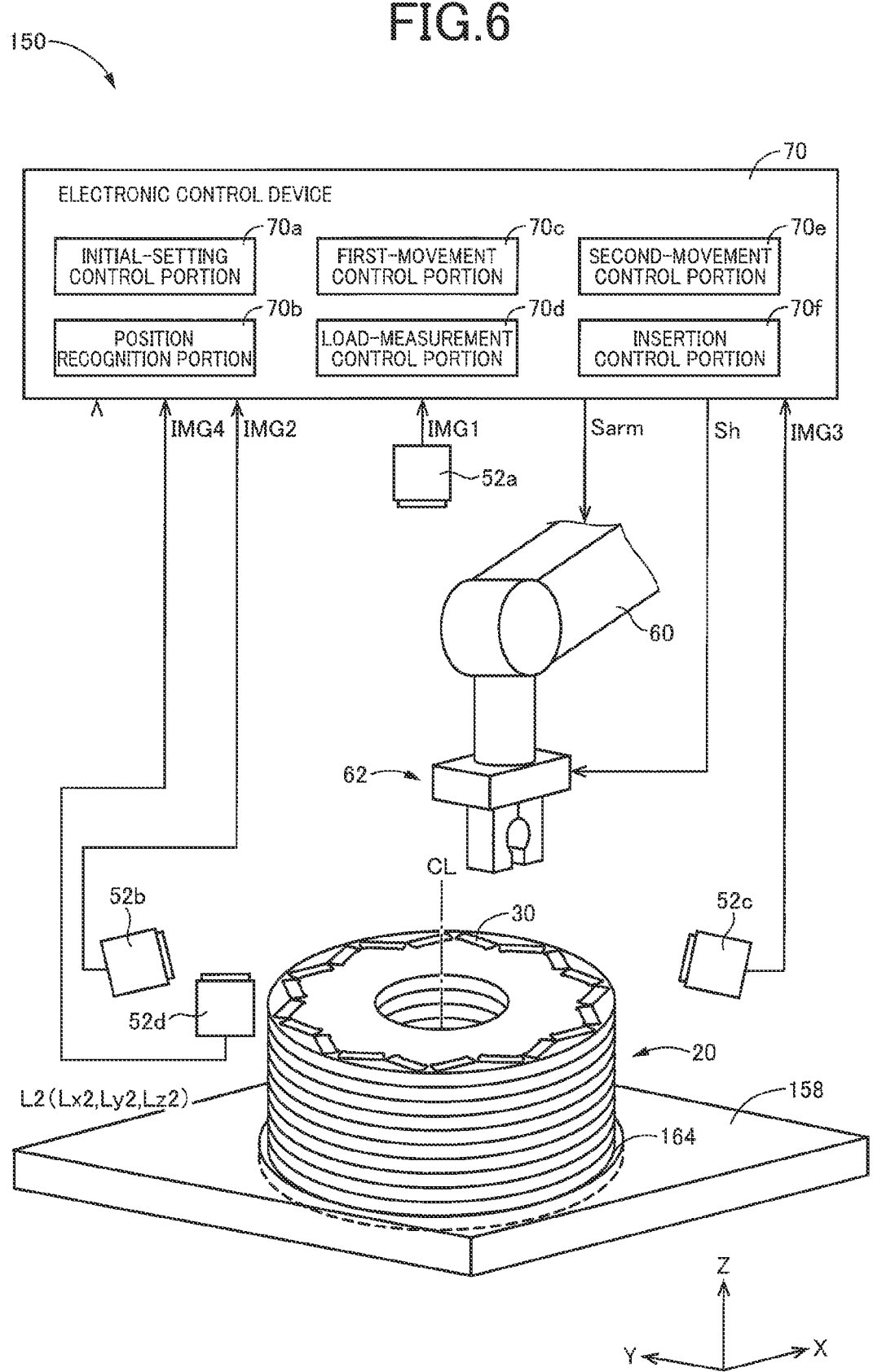
FIG. 6 is a view for explaining a construction of a rotor assembly apparatus that is to be used in a method of assembling the rotor, which is according to a second embodiment of the present invention, and also for explaining major portions of control functions that are provided to perform various control operations in the rotor assembly apparatus.

FIG. 6 is a view for explaining a construction of a rotor assembly apparatus 150 that is to be used in a method of assembling the rotor, which is according to a second embodiment of the present invention, and also for explaining major portions of control functions that are provided to perform various control operations in the rotor assembly apparatus 150. The rotor assembly apparatus 150 is substantially the same in construction as the rotor assembly apparatus 50 in the above-described first embodiment, but is different from the rotor assembly apparatus 50 in that the table 58 and the load sensor 64 are replaced by a table 158 and a load sensor 164, respectively. In the following description of this second embodiment, there will be described mainly elements different from those of the first embodiment. The same reference signs as used in the first embodiment will be used in the following second embodiment, to identify the functionally corresponding elements, and descriptions thereof are not provided.

The table 158 is a base on which the rotor core 20 is to be fixedly held such that the axis CL of the rotor core 20 is parallel to the vertical direction. The table 158 serves as a core holding portion (core holding means) configured to fixedly hold the rotor core 20 such that the rotor core 20 is unmovable relative to the table 158. The load sensor 164 is attached to a portion of the table 158 onto which the rotor core 20 is to be fixed. The load sensor 164 is constituted by a strain sensor, for example, and is configured to measure a load Lx2 [N], a load Ly2 [N] and a load Lz2 [N] that act in the respective X-axis direction, Y-axis direction and Z-axis direction and are applied to the rotor core 20 fixed on the table 158. The measured load Lx2, load Ly2 and load Lz2 are respective components of a load L2 [N] applied to the rotor core 20. That is, the measured load Lx2, load Ly2 and load Lz2 are the respective components of the load L2 that act in the respective X-axis direction, Y-axis direction and Z-axis direction. The load L2 [N] as a vector quantity corresponds to "load" recited in the appended claims.

The method of assembling the rotor 10, i.e., a method of inserting the permanent magnet 34 into the slot 30, according to this second embodiment is substantially the same as the method according to the above-described first embodiment, but is different from the method according to the first embodiment in that the load L2 applied to the rotor core 20 in place of the load L1 applied to the permanent magnet 34 is calculated at the load measuring step and in that the permanent magnet 34 is horizontally moved depending on data relating to the load L2 in place of the data relating to the load L1 such that the positional deviation G is reduced.

During movement (downward movement) of the permanent magnet 34 at the load measuring step corresponding to function of the load-measurement control portion 70d, the load L2 applied to the rotor core 20 is constantly calculated by the load sensor 164. At the load measuring step, when the load L2 exceeds a predetermined load limit Llmt2 [N], the load-measurement control portion 70d suspends movement (downward movement) of the permanent magnet 34. The load limit Llmt2 is a predetermined determination value that is obtained by experimentation or determined by an appropriate design theory, so as to determine whether an amount of the deformation of the permanent magnet 34 and the rotor core 20 caused by contact of the permanent magnet 34 and the rotor core 20 is within a tolerable range or not. For example, the load limit Llmt2 in this second embodiment and the load limit Llmt1 in the above-described first embodiment are equal to each other in amount, and are opposite to each other in direction. In this second embodiment, the load L2 is compared with the predetermined load limit Llmt2, and the movement of the permanent magnet 34 is suspended when the load L2 exceeds the predetermined load limit Llmt2. However, predetermined load limits may be set for the respective loads Lx2, Ly2, Lz2 measured by the load sensor 164, such that the movement of the permanent magnet 34 is suspended when at least one of the loads Lx2, Ly2, Lz2 exceeds a corresponding one of the load limits.

At the load measuring step, in a case in which the permanent magnet 34 has been downwardly moved by the distance (=D0+δ) that is slightly larger than the vertical clearance distance D0, without the measured load L2 exceeding the load limit Llmt2, it is regarded that the longitudinal end portion 34t1 of the permanent magnet 34 has started to be inserted into the slot 30 without the amount of the deformation of the permanent magnet 34 and the rotor core 20 exceeding the tolerable range.

At the load measuring step, in a case in which the measured load L2 has exceeded the load limit Llmt2, it is regraded that the longitudinal end portion 34t1 of the permanent magnet 34 has been brought into contact with the rotor core 20, and the longitudinal end portion 34t1 has not been inserted into the slot 30. The load L2, which is caused upon contact of the permanent magnet 34 with the rotor core 20, is a force applied from the permanent magnet 34 to the rotor core 20 that is fixedly held on the table 158 provided with the load sensor 164.

As is obvious from the law of action and reaction, upon contact of the permanent magnet 34 and the rotor core 20 with each other, the load L1 and the load L2 are equal to each other in amount, and are opposite to each other in direction. Therefore, in the electronic control device 70, the load L1 can be calculated based on the load L2, and a direction in which is a force is applied to the permanent magnet 34 from the rotor core 20 can be calculated.

At the second moving step corresponding to function of the second-movement control portion 70e, the permanent magnet 34 is horizontally moved depending on the data relating to the load L2 measured at the load measuring step, such that the positional deviation G is reduced. Like the above-described data relating to the load L1, the data relating to the load L2 include not only the amount of the load L2 but also the direction of the load L2 (i.e., direction in which the load L1 acts), wherein the amount and direction of the load L2 are calculated based on the load Lx2, load Ly2 and load Lz2 which act in the respective X-axis direction, Y-axis direction and Z-axis direction and which are measured by the load sensor 164. For example, the direction of the load L1 can be obtained by inverting the direction of the load L2, and the permanent magnet 34 is horizontally moved such that the positional deviation G is reduced as in the above-described first embodiment.

The method of assembling the rotor 10 and the electronic control device 70 for the rotor assembly apparatus 150 according to the present second embodiment provide substantially the same effects as those according to the above-described first embodiment.

While the preferred embodiments of this invention have been described in detail by reference to the drawings, it is to be understood that the invention may be otherwise embodied.

In each of the above-described first and second embodiments, the vehicle rotating electric machine MG is a motor generator serving as a drive power source for driving the vehicle. However, the vehicle rotating electric machine MG does not necessarily have to be a motor generator, but may be also an electric machine having only a function serving as a motor for driving the vehicle without a function serving as a generator, or an electric machine having only a function serving as a generator for electric regeneration without a function serving as a motor.

In each of the above-described first and second embodiments, the magnet center position Pcm is the center of gravity of the permanent magnet 34 while the slot center position Pcs is the center of gravity of the slot 30 in the case of assuming that the slot 30 is filled with a homogeneous substance. However, this arrangement is not essential. For example, the magnet center position Pcm may be an area center (geometric center of gravity) of an end surface of the longitudinal end portion 34$t$1 of the permanent magnet 34 while the slot center position Pcs may be an area center (geometric center of gravity) of the opening 30$op$. In this modified arrangement, too, the positional deviation G can be reduced, by horizontally moving the permanent magnet 34 such that the magnet center position Pcm is aligned with the slot center position Pcs.

In the above-described first embodiment, the load sensor 64 is attached to the magnet holding portion 62. In the above-described second embodiment, the load sensor 164 is attached to the table 158. However, each of the load sensors 64, 164 may be attached to any portion or member as long as it can measure the load L1 applied to the permanent magnet 34 either directly or indirectly at the load measuring step.

In the above-described first and second embodiments, the loads L1, L2 are constantly measured at the load measuring step. However, the loads L1, L2 may be measured intermittently and repeatedly.

In the above-described first and second embodiments, the load limits Llmt1, Llmt2 are set for the respective loads L1, L2. However, the load limits Llmt1, Llmt2 do not necessarily have to be set for the respective loads L1, L2. For example, at the load measuring step, in a case in which the amount of the deformation of the permanent magnet 34 and the rotor core 20 does not exceed the tolerable range even if the longitudinal end portion 34$t$1 is brought into contact with the rotor core 20 when the permanent magnet 34 is downwardly moved by the distance (=D0+δ) slightly larger than the vertical clearance distance D0, the load limits Llmt1, Llmt2 do not have to be set for the respective loads L1, L2. Further, at the load measuring step, the loads L1, L2 do not necessarily have to be constantly measured, as long as the loads L1, L2 are measured at least when the permanent magnet 34 has been moved downwardly by the distance (=D0+δ) slightly larger than the vertical clearance distance D0.

In the above-described first and second embodiments, each of the load measuring step and the second moving step is implemented a plurality of times after the first moving step and before the inserting step. However, each of the load measuring step and the second moving step does not have to be implemented a plurality of times, as long as each of the load measuring step and the second moving step is implemented at least one time after the first moving step and before the inserting step. In this modified arrangement, too, the position of the permanent magnet 34 can be corrected as needed such that that the positional deviation G is reduced, so that the reduction of the insertability of the permanent magnet 34 into the slot 30 can be suppressed even where the cross section of the slot 30 perpendicular to the longitudinal direction is made small, as compared with an arrangement in which the load measuring step and the second moving step are not implemented.

In the above-described first and second embodiments, at the first moving step, the permanent magnet 34 is moved horizontally. However, this arrangement is not essential. At the first moving step, the permanent magnet 34 may be moved not only horizontally but also vertically, as long as the permanent magnet 34 is moved such that the longitudinal end portion 34$t$1 is positioned to be opposed to the opening 30$op$.

In the above-described first and second embodiments, at the second moving step implemented after the load measuring step, the separating step in which the permanent magnet 34 is moved in the direction indicated by the arrow D3 and the position correcting step in which the permanent magnet 34 is moved in the direction indicated by the arrow D4, are implemented separately from each other. However, this arrangement is not essential. For example, the second moving step may be modified such that the movement of the permanent magnet 34 in the direction indicated by the arrow D3 and the movement of the permanent magnet 34 in the direction indicated by the arrow D4 may be made concurrently with each other such that the positional deviation G is reduced. Further, the second moving step may be modified such that the position correcting step is implemented after a corresponding one of the loads L1, L2 measured at the load measuring step is made zero without the longitudinal end portion 34$t$1 being separated from the opening 30$op$.

In the above-described first and second embodiments, at the first moving step, the permanent magnet 34 is horizontally moved such that the magnet center position Pcm is aligned with the slot center position Pcs as seen in the vertical direction, wherein the magnet center position Pcm is recognized based on the image data IMG2, IMG3, IMG4 representing the images taken by the cameras 52$b$, 52$c$, 52$d$ while the slot center position Pcs is recognized based on the image data IMG1 representing the image taken by the camera 52$a$. However, this arrangement is not essential. For example, at the first moving step, the permanent magnet 34 may be horizontally moved based on data representing the position of the robot arm 60 relative to a corresponding one of the tables 58, 158 at the initial state, without based on the image data IMG1, IMG2, IMG3, IMG4 representing the images taken by the cameras 52a, 52b, 52c, 52d. Further, the permanent magnet 34 does not have to be photographed necessarily by the three cameras 52b, 52c, 52d but may be photographed by the two cameras 52b, 52c configured to take the respective images of the permanent magnet 34 from different angles, as long as the fixing error of the permanent magnet 34 by the magnet holding portion 62 (i.e., positional deviation or inclination of the permanent magnet 34 fixedly held by the magnet holding portion 62, relative to the magnet holding portion 62) can be recognized. Further, at the first moving step, the horizontal movement of the permanent magnet 34 may be made not only based on the image data IMG1, IMG2, IMG3, IMG4 representing the images taken by the cameras 52a, 52b, 52c, 52d but also based on the data representing the position of the robot arm 60 relative to a corresponding one of the tables 58, 158 at the initial state.

In the above-described first and second embodiments, there has been described, by way of example, the case, with reference to FIG. 4A to 4D, in which the slot center position Pcs and the magnet center position Pcm are deviated from each other, after the first moving step, only in the right-left direction on the drawing sheet by the positional deviation amount G1, as seen in the vertical direction. However, the present invention is applicable also to a case in which the slot center position Pcs and the magnet center position Pcm are deviated from each other, after the first moving step, in another direction such as a depth direction on the drawing sheet of FIG. 4A to 4D as seen in the vertical direction. Further, the present invention is applicable also to a case in which the magnet center position Pcm is aligned with the slot center position Pcs as seen in the vertical direction but the permanent magnet 34 is deviated from a predetermined angular position relative to the slot 30 about the magnet center position Pcm and the slot center position Pcs that are aligned with each other.

In the above-described case in which the magnet center position Pcm is aligned with the slot center position Pcs as seen in the vertical direction but the permanent magnet 34 is circumferentially deviated from the predetermined angular position relative to the slot 30, the loads Lx1, Ly1 (Lx2, Ly2) as horizontal components of the load L1 (L2), which are measured at the load measuring step, could be zero while the load Lz1 (Lz2) as a vertical component, which is also measured at the load measuring step, is a positive value. In that case, at the second moving step, the permanent magnet 34 is rotated about the magnet center position Pcm relative to the slot 30 by a predetermined degree α [rad] in one of opposite directions or the other of the opposite directions, without the magnet center position Pcm being moved relative to the slot center position Pcs as seen in the vertical direction, so that it is possible to reduce a positional deviation θ [rad] between the permanent magnet 34 and the slot 30 in a circumferential direction about the magnet center position Pcm and the slot center position Pcs that are aligned with each other. It is noted that the predetermined degree α is a predetermined value which is obtained by experimentation or determined by an appropriate design theory, and by which the permanent magnet 34 is to be rotated about the magnet center position Pcm relative to the slot 30 at the second moving step, and that the predetermined degree α is smaller than an angular error caused by the above-described fixing error and/or the recognition error. It is noted that the above-described positional deviation θ in the circumferential direction corresponds to "positional deviation between the permanent magnet and the hole portion, as seen in the direction parallel to the axis", which is recited in the appended claims, and that the above-described arrangement in which the permanent magnet 34 is rotated about the magnet center position Pcm relative to the slot 30 by the predetermined degree a in one of the opposite directions or the other of the opposite directions corresponds to "moving at least one of the permanent magnet and the rotor core so as to change the position of the permanent magnet relative to the rotor core, depending on data relating to the load measured at the load measuring step, such that a positional deviation between the permanent magnet and the hole portion, as seen in the direction parallel to the axis, is reduced", which is recited in the appended claims.

In the above-described first and second embodiments, the rotor core 20 and the permanent magnet 34 are fixedly held such that both of the axis CL direction of the rotor core 20 and the longitudinal direction of the permanent magnet 34 are held parallel to the vertical direction. However, this arrangement is not essential. For example, the rotor core 20 and the permanent magnet 34 may be fixedly held such that axis CL direction of the rotor core 20 and the longitudinal direction of the permanent magnet 34 are parallel to each other and are inclined with respect to the vertical direction by a certain degree.

In the above-described first and second embodiments, the permanent magnet 34 is moved, by the robot arm 60, relative to the rotor core 20. However, this arrangement is not essential. For example, it is possible to modify the arrangement such that the rotor core 20 is moved relative to the permanent magnet 34 by a movement mechanism (not shown) configured to move a corresponding one of the tables 58, 158 while the permanent magnet 34 held by magnet holding portion 62 is fixed. In this modified arrangement, the electronic control device 70 controls the above-described movement mechanism, rather than controlling the robot arm 60, so as to move the rotor core 20 fixed on the corresponding one of the tables 58, 158. Further, in each of the first and second moving steps, not only either of the permanent magnet 34 and the rotor core 20 but also both of the permanent magnet 34 and the rotor core 20 may be moved so as to change the position of the permanent magnet 34 relative to the rotor core 20. In an arrangement in which both of the permanent magnet 34 and the rotor core 20 are movable, the permanent magnet 34 may be configured to be moved in the Z-axis direction (i.e., vertical direction) while the rotor core 20 may be configured to be moved in the X-axis and Y-axis directions (i.e., horizontal directions), for example.

It is to be understood that the embodiments described above are given for illustrative purpose only, and that the present invention may be embodied with various modifications and improvements which may occur to those skilled in the art.

NOMENCLATURE OF ELEMENTS

10: rotor
20: rotor core
30: slot (hole portion)
30op: opening
34: permanent magnet
34t1: longitudinal end portion
50; 150: rotor assembly apparatus
52a, 52b, 52c, 52d: cameras
64; 164: load sensor
70: electronic control device (control device)

70c: first-movement control portion (first moving step)
70d: load-measurement control portion (load measuring step)
70e: second-movement control portion (second moving step)
70f: insertion control portion (inserting step)
CL: axis
L1 (Lx1, Ly1, Lz1): load
L2 (Lx2, Ly2, Lz2): load
Llmt1: load limit
Llmt2: load limit
G: positional deviation
θ: positional deviation

What is claimed is:

1. A method of assembling a rotor including a cylindrical rotor core and a permanent magnet that is held in a hole portion as slot of the cylindrical rotor core such that a longitudinal direction of the permanent magnet is parallel to an axis of the cylindrical rotor core, the method comprising in an order sequential steps of:
a first moving step of moving at least one of the permanent magnet and the cylindrical rotor core so as to change a position of the permanent magnet relative to the cylindrical rotor core, such that a longitudinal end portion of the permanent magnet is positioned to be opposed to an opening of the hole portion;
a load measuring step of moving one of the permanent magnet and the cylindrical rotor core toward the other of the permanent magnet and the cylindrical rotor core in an approaching direction that is parallel to the axis, and measuring a load applied to at least one of the permanent magnet and the cylindrical rotor core, by a load sensor, when the longitudinal end portion of the permanent magnet is brought into contact with the cylindrical rotor core;
a second moving step of moving at least one of the permanent magnet and the cylindrical rotor core so as to change the position of the permanent magnet relative to the cylindrical rotor core, depending on data relating to the load measured at the load measuring step, such that a positional deviation between the permanent magnet and the hole portion, as seen in a direction parallel to the axis, is reduced; and
an inserting step of inserting the permanent magnet into the hole portion, by moving the one of the permanent magnet and the cylindrical rotor core relative to the other of the permanent magnet and the cylindrical rotor core in a direction same as the approaching direction.

2. The method according to claim 1,
further comprising a predetermined load limit,
implementing the second moving step when the load measured at the load measuring step exceeds the predetermined load limit, and
implementing the inserting step when the load measured at the load measuring step does not exceed the predetermined load limit.

3. The method according to claim 2,
wherein, when the load measured at the load measuring step exceeds the predetermined load limit, movement of the one of the permanent magnet and the cylindrical rotor core toward the other of the permanent magnet and the cylindrical rotor core is suspended at the load measuring step.

4. The method according to claim 1,
implementing the second moving step a plurality of times, after the first moving step and before the inserting step.

5. The method according to claim 1,
moving, at the first moving step, the at least one of the permanent magnet and the cylindrical rotor core so as to change the position of the permanent magnet relative to the cylindrical rotor core, depending on data representing images of the hole portion and the permanent magnet which are taken by cameras.

6. The method according to claim 1,
moving, at the first moving step, the permanent magnet relative to the cylindrical rotor core, such that the longitudinal end portion of the permanent magnet is positioned to be opposed to the opening of the hole portion,
moving, at the load measuring step, the permanent magnet in the approaching direction that is toward the opening,
moving, at the second moving step, the permanent magnet relative to the cylindrical rotor core, depending on the data relating to the load, such that the positional deviation is reduced; and
moving, at the inserting step, the permanent magnet relative to the cylindical rotor core in the direction same as the approaching direction, so as to insert the permanent magnet into the hole portion.

7. The method according to claim 1,
wherein the data relating to the load include amounts of respective two components of the load which act in respective two directions perpendicular to each other and perpendicular to the axis, and
moving, at the second moving step, each of the at least one of the permanent magnet and the cylindrical rotor core in a direction dependent on the amounts of the respective two components of the load.

* * * * *